United States Patent [19]
Zivica

[11] 3,822,494
[45] July 9, 1974

[54] WALL PLAQUE AND METHOD OF FABRICATING SAME

[75] Inventor: Robert F. Zivica, St. Claire Shores, Mich.

[73] Assignee: Select Markets, Inc., Detroit, Mich.

[22] Filed: Oct. 20, 1972

[21] Appl. No.: 299,373

[52] U.S. Cl.................................. 40/154, 40/160
[51] Int. Cl............................................. G09f 1/12
[58] Field of Search........... D29/23 A; 40/160, 154, 40/152

[56] References Cited
UNITED STATES PATENTS

| | | | |
|---|---|---|---|
| 2,312,007 | 2/1943 | Thrasher | 40/154 |
| 3,420,361 | 1/1969 | Newberg | 40/154 |
| 3,468,045 | 9/1969 | Keller et al. | 40/1.5 |
| 3,473,247 | 10/1969 | La Favor et al. | 40/160 X |
| 3,715,823 | 2/1973 | Brossard | 40/152 |
| D211,031 | 5/1968 | Eddy | D29/23 A |

Primary Examiner—Wm. H. Grieb
Assistant Examiner—Wenceslao J. Contreras
Attorney, Agent, or Firm—Weiner, Basile and Weintaug

[57] ABSTRACT

A wall plaque having an outer rim member fabricated from a thermoplastic polystyrene with a surface finish resembling a wood grain. The rim member is provided with a central aperture receiving a concave dish-shaped center plate on which is mounted a decorative member representative of a sport, such as football or the like. Integrally molded to the concave surface of the center plate is indicia representative of the particular sport for example, the name of a football team, or the like. The rim member and center plate are fabricated in such a manner that they are interchangeable for use with different decorative members and indicia representative of different sports such that only one set of molds is required to fabricate the rim member and center plate, which rim member and center plate are interchangeably used in the fabrication of wall plaques representative of different sports and the like. A method of fabricating the wall plaque is disclosed.

7 Claims, 3 Drawing Figures

PATENTED JUL 9 1974 3,822,494

3,822,494

WALL PLAQUE AND METHOD OF FABRICATING SAME

BACKGROUND OF THE INVENTION

1. Field of the Invention

The present invention relates to three-dimensional plaques and to a method of fabricating such wall plaques such that basic components thereof are interchangeable for use in the fabrication of a plurality of three-dimensional wall plaques depicting various decorative members.

2. Description of the Prior Art

Heretofore three-dimensional wall plaques have been provided such as those disclosed in United States Letters Patent Nos. 2,312,007; 3,181,869; and 3,474,598. Other Letters Patents have disclosed various methods for manufacturing wall plaques and related articles such as United States Letters Patent Nos. 3,313,057; 3,212,204; 1,382,739; 3,137,038; 439,139; 3,277,535 and French Patent No. 1,378,696. Although these patents disclose various structures, wall plaques and methods for manufacturing the same, and having a bearing on the present invention, none of the prior art, to the knowledge of the inventor herein, discloses any of the novel features of the present invention.

SUMMARY OF THE INVENTION

The present invention which will be described subsequently in greater detail hereinafter comprises a wall plaque fabricated from a plurality of components each of which is made from a moldable material such as polystyrene and which components may be assembled in a manner depicting a variety of sports, such as football and the like, by the employment of common elements of the wall plaque in conjunction with selective decorative members and indicia bearing a relationship to the selected decorative member.

It is therefore an object of the present invention to provide a new and improved wall plaque for depicting decorative three-dimensional figures and a method for fabricating the same.

It is also an object of the present invention to provide a method for manufacturing such three-dimensional wall plaques utilizing common components in the manufacture of different wall plaques illustrating a variety of decorative members.

Other objects, advantages and applications of the present invention will become apparent to those skilled in the art of fabricating wall plaques and the like when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which.

DESCRIPTION OF THE PREFERRED EMBODIMENT

Figure 1:
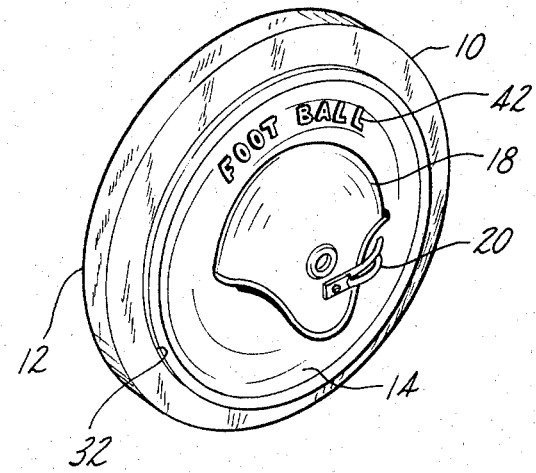
FIG. 1 is a perspective view of a wall plaque constructed in accordance with the principles of the present invention.
Figure 2:
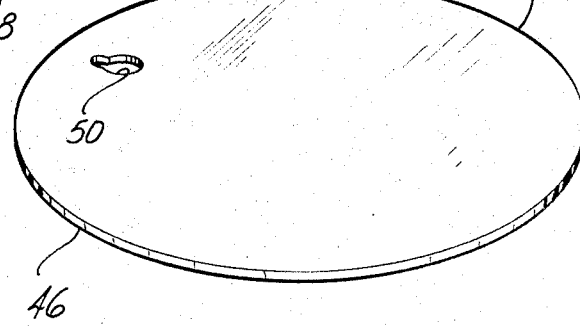
FIG. 2 is an exploded perspective view of the wall plaque illustrated in FIG. 1.

Referring now to the drawing and, in particular, to FIGS. 1 and 2 wherein there is illustrated one example of the present invention in the form of a wall plaque 10 comprising a hollow outer rim member 12, a center plate structure 14, a backing plate member 16, a decorative member 18 such as a football helmet, and a component 20 thereof.

Figure 3:
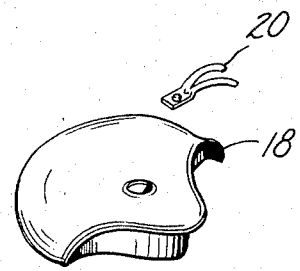
FIG. 3 is cross-sectional view of the wall plaque illustrated in FIG. 1.
Figure 3:
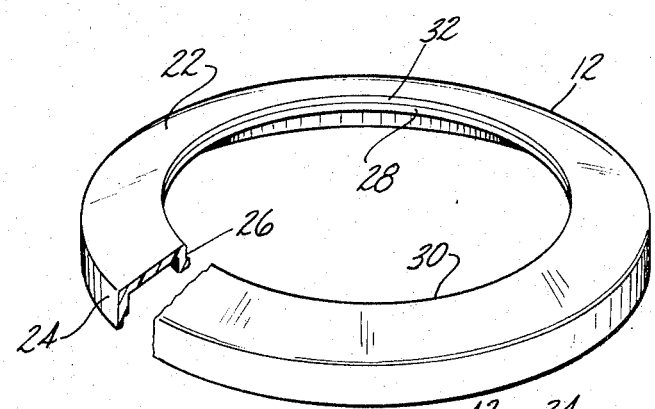
Figure 3:
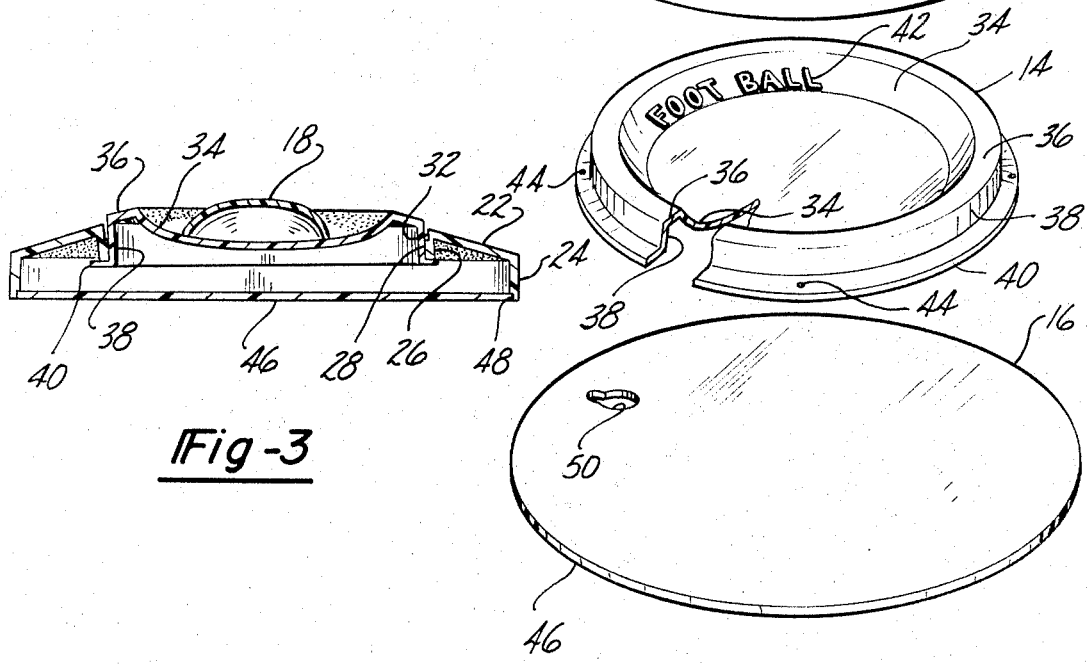

As can best be seen in FIGS. 2 and 3, the rim member 12 is circular in shape and comprises an inclined ring portion 22 having upstanding circular walls, such as outer and inner wall members 24 and 26, respectively, at the lower and upper edges thereof, with a first or exposed surface 28 of the upstanding wall 26 defining an opening or central aperture 30 in the central portion of the rim member 12. The wall 26 is further provided with second and third surfaces disposed substantially parallel to the major surface of member 16, with such third surface forming part of a decorative annular recess 32 extending around the peripheral edge of the opening 30. Recess 32 serves as a function which will be described hereinafter.

In the preferred embodiment, the rim member 12 is fabricated from a foamed structural thermo-plastic polystyrene that is molded to the desired form although an injection-molding process may be utilized. The upper exposed surface of the ring member 22 and the outer exposed surface of the upstanding wall 24 are both molded to have a wood grain surface effect which is preferably finished by first painting the same with a brown paint followed by an application of black stain which, in turn, is wiped off leaving a black residue in the indentations forming the wood grains, while the smooth sections of the surfaces remain brown giving the appearance of wood. The entire rim member 12 is then coated with a clear protective material or the like. It should be noted that other colors and stains may be employed to provide any desired appearance.

Still referring to FIGS. 2 and 3 the center plate 14 is illustrated as comprising a concave dish-shaped member or portion 34, the upper peripheral edge of which is integrally attached to a downwardly inclined ring portion 36 which, in turn, has integrally attached thereto an L-shaped flange structure comprising an annular upstanding wall 38 that terminates in a radially, outwardly extending annular flange member 40.

Indicia 42 is disposed on the exposed surface of the disc-shaped portion 34 and which for purposes of illustration is the word "Football," but it is to be understood that the indicia 42 may take other forms, such as will be explained hereinafter. The indicia 42 is integrally formed on the surface of the disc-shaped member 34 when the center plate 14 is itself formed and in the preferred embodiment the center plate 14 is injection-molded using a thermoplastic polystyrene. The process of fabricating the center plate 34 with the indicia thereon requires that two molds be utilized. The first mold, which is an aluminum plug (not shown) that has an inner surface complementary to the disc surface 34, is inserted into a second mold which has the contour of the remainder of the center plate 14. The indicia 42, whatever its desired configuration may be, is disposed on the aluminum plug and thus simply by using aluminum plugs having different letter configuration, as desired, center plates may be formed for any variety of applications having any desired indicia 42 as will be explained hereinafter. After formation of the center plate 14 with whatever desired indicia 42 is incorporated thereon, the plate 14 is painted with whatever desired color that is complimentary to the decorative member 18 utilized and, preferably, the disc-shaped surface 34 is painted black along with the indicia 42, while the upper exposed face of the indicia 42 is hot-stamped with a vacuum-palletized milar to give a gold appearance; however, other forms of coloring and stamping may be utilized as desired.

After fabrication of the center plate 14, the same is inserted through the aperture 30 in the rim member 12 through the bottom thereof, such that the outer surface of the upstanding wall 38 of the center plate 14 comes into an abutting contact with the inner exposed surface 28 of the upstanding wall 26 with the radially outwardly extending annular flange member 40 abutting the second surface or bottom edge of the upstanding wall 26. The abutting surfaces of the flange 40 and the bottom edge of the upstanding wall 26 may be secured to one another by any suitable fastening means, such as an adhesive, however, in the preferred embodiment screws (not shown) extend upwardly through apertures 44 (FIG. 2) in the flange 40 and into bores (not shown) in the lower edge of the upstanding wall 26 of the rim member 12.

The notch or recess 32, as can best be seen in FIGS. 1 and 3, is visible from the exposed side of the wall plaque 10 after the center plate 14 has been inserted into the rim member aperture 30 providing an additional decorative effect for the wall plaque 10.

A suitable decorative member such as the football helmet 18 and its face guard component 20 are then attached to the exposed concave surface 34 of the center plate 14 by any suitable means such as an adhesive or, preferably, by means of an ultrasonic sealing. The decorative member 18 may be injection-molded utilizing a polystyrene material and has its bottom surface formed to be complementary to the concave surface 34 of the center plate 14 so that the same smoothly fits thereon in an esthetically pleasing manner. The football helmet guard piece 20 is attached to the helmet by an adhesive or the like. Prior to installation of the helmet upon the concave surface 34 of the center plate, the helmet is painted and is embellished with decals corresponding to a particular football team in which the wall plaque represents, while the indicia formed on the center plate 14 may indicate the name of the football team which the helmet represents.

The final component of the wall plaque is a flat circular backing plate 46 which may also be injection-molded from polystyrene or the like, and is so sized as to fit in an annular groove 48 formed in the lower edge of the upstanding wall 24 and retained therein by any suitable means such as an adhesive, screws or the like. The backing member 46 is provided with an aperture 50 at a point near its periphery to permit the mounting of the plaque 10 on a wall by means of engagement with a nail or the like carried by the wall.

It can be appreciated by those skilled in the art of wall plaques that the football helmet may be replaced by other suitable decorative members such as a baseball, hockey sticks, or the like with the indicia formed on the center plate 34 being representative of a name of a team associated with the particular decorative member utilized.

It can also be appreciated by those skilled in the art of wall plaques and a method for fabricating the same in which numerous components of the wall plaque are interchangeable, that is, the rim member, center plate, backing plate, helmet, and face guard can be used to make plaques which are representative of different football teams with the aforementioned manner of providing different indicia 42 representative of the particular football team.

It can also be seen that by having other decorative members such as a basketball, hockey stick, baseball or the like and utilizing the aforementioned manner of providing indicia representative of the particular decorative member, numerous wall plaques can be manufactured with a minimal amount of investment in tooling as the basic components of the system are interchangeable.

It can thus be seen the present invention has provided a new and improved method for manufacturing wall plaques in which the wall plaque itself is of a novel and distinctive structure.

It should also be understood by those skilled in the art of wall plaques that materials other than polystyrene may be used in the fabrication of the wall plaque 10 as, for example, polyurethane, polyethylene, and other suitable plastics.

Although only one embodiment of the present invention has been disclosed, it should be understood by those skilled in the art of manufacturing wall plaques that other forms may be had all coming within the spirit of the invention and the scope of the appended claims.

I claim:

1. A wall plaque comprising, in combination:
   a. a backing plate member having the shape of a substantially planar circular disc;
   b. a hollow outer rim member having an inclined ring portion disposed between and integral with an outer wall member and an inner wall member;
   c. said inner wall member having a first surface defining a central aperture, and second and third surfaces disposed substantially parallel to the major surface of said backing plate member;
   d. said first surface being disposed substantially perpendicular to said major surface of said backing plate member;
   e. a center plate structure having a centrally-disposed concave dish-shaped member integral with and surrounded by an L-shaped flange structure;
   f. said center plate structure being shaped and dimensioned to be disposed within said central aperture of said hollow outer rim member with said inner wall member of said hollow outer rim member in abutting contact against said L-shaped flange structure of said center plate structure;
   g. said L-shaped flange structure having an annular wall integral with and disposed substantially perpendicular to a flange member;
   h. means for connecting said flange member to said second surface of said inner wall member so that said annular wall of said L-shaped flange structure is in abutting contact against said first surface of said inner wall member, and so that said third surface of said inner wall member in conjunction with said annular wall of said L-shaped structure and said inner wall member forms a visible decorative recess surrounding said central aperture of said hollow outer rim member after said center plate structure has been disposed within said central aperture of said hollow outer rim member;

i. a decorative member having a convex back surface which is complementary in shape with and is adapted to mate with said centrally-disposed concave dish-shaped member of said center plate structure;

j. means for connecting said decorative member to said centrally-disposed concave dish-shaped member of said center plate structure;

k. indicia means carried by said centrally-disposed concave dish-shaped member of said center plate structure and circumscribing at least a portion of said decorative member; and l. said backing plate member being engageable with said outer wall member of said hollow rim member for enclosing the interior of said wall plaque.

2. A wall plaque according to claim 1, wherein said hollow outer rim member and said center plate structure are selectively interchangeable with different ones of said decorative members and said indicia means.

3. A wall plaque according to claim 1, wherein said indicia means comprises a descriptive message relating to said decorative member, and said indicia means and said decorative member being selectively interchangeable with said hollow outer rim member.

4. A wall plaque according to claim 1, wherein said indicia means comprises letters which are integrally formed on the concave surface of said dish-shaped member of said center plate structure.

5. A wall plaque according to claim 1, wherein said hollow outer rim member is fabricated from a moldable material, and the exposed visible surface of said inclined ring portion and said outer wall member of said hollow rim member are provided with indentations resulting in a wood grain effect.

6. A wall plaque according to claim 1, wherein said hollow outer rim member is fabricated from a material selected from the group consisting of polystyrene, polyurethane, polyethelene, and plastic.

7. A wall plaque according to claim 1, wherein said hollow outer rim member is fabricated from a foam structural thermoplastic polystyrene.

* * * * *